US010570572B2

(12) United States Patent
Sakai et al.

(10) Patent No.: US 10,570,572 B2
(45) Date of Patent: Feb. 25, 2020

(54) RAILROAD RAIL TRACK PAD COMPOSITION AND RAILROAD RAIL TRACK PAD

(71) Applicant: Mitsui Chemicals, Inc., Tokyo (JP)

(72) Inventors: Tatsuya Sakai, Ichihara (JP); Yuji Ishii, Ichihara (JP); Kiyohide Inomata, Ichihara (JP); Kotaro Ichino, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 60 days.

(21) Appl. No.: 15/561,507

(22) PCT Filed: Mar. 11, 2016

(86) PCT No.: PCT/JP2016/057693
§ 371 (c)(1),
(2) Date: Sep. 25, 2017

(87) PCT Pub. No.: WO2016/152571
PCT Pub. Date: Sep. 29, 2016

(65) Prior Publication Data
US 2018/0066402 A1  Mar. 8, 2018

(30) Foreign Application Priority Data

Mar. 26, 2015  (JP) ................................. 2015-064039

(51) Int. Cl.
| | | |
|---|---|---|
| *E01B 9/68* | (2006.01) | |
| *C08J 9/06* | (2006.01) | |
| *C08F 210/18* | (2006.01) | |
| *C08K 5/548* | (2006.01) | |
| *C08L 23/16* | (2006.01) | |
| *C08K 3/34* | (2006.01) | |
| *C08J 9/10* | (2006.01) | |
| *C08K 3/06* | (2006.01) | |
| *C08K 9/06* | (2006.01) | |
| *C08K 5/00* | (2006.01) | |
| *C08K 3/36* | (2006.01) | |

(52) U.S. Cl.
CPC ............ *E01B 9/683* (2013.01); *C08F 210/18* (2013.01); *C08J 9/06* (2013.01); *C08J 9/105* (2013.01); *C08K 3/346* (2013.01); *C08K 5/548* (2013.01); *C08L 23/16* (2013.01); *E01B 9/68* (2013.01); *C08K 3/06* (2013.01); *C08K 3/36* (2013.01); *C08K 5/0025* (2013.01); *C08K 9/06* (2013.01)

(58) Field of Classification Search
CPC . C08F 210/18; C08J 9/06; C08J 9/105; C08K 3/06; C08K 3/346; C08K 3/36; C08K 5/0025; C08K 5/548; C08K 9/06; C08L 23/16; E01B 9/68; E01B 9/683
See application file for complete search history.

(56) References Cited

U.S. PATENT DOCUMENTS

| | | | |
|---|---|---|---|
| 6,864,315 B1 | 3/2005 | Hakuta et al. | |
| 2006/0142437 A1* | 6/2006 | Hakuta | ...................... C08J 3/24 |
| | | | 524/81 |
| 2009/0239014 A1* | 9/2009 | Noguchi | .................. C08K 3/22 |
| | | | 428/36.8 |
| 2011/0233448 A1 | 9/2011 | Ebata et al. | |
| 2012/0220728 A1* | 8/2012 | Uekusa | ................. C08F 210/00 |
| | | | 525/240 |

FOREIGN PATENT DOCUMENTS

| | | |
|---|---|---|
| JP | 2006-265841 A | 10/2006 |
| JP | 2010-281082 A | 12/2010 |
| JP | 2011-195656 A | 10/2011 |
| JP | 2011-195808 A | 10/2011 |
| JP | 2013-002256 A | 1/2013 |
| JP | 2014-122305 A | 7/2014 |
| WO | WO-2013/137231 A1 | 9/2013 |

OTHER PUBLICATIONS

Korean Office Action dated Mar. 12, 2018 in corresponding application No. 201801709331.
International Search Report and Japanese Language Written Opinion received in International Application No. PCT/JP2016/057693 dated May 31, 2016.
Extended European Search Report dated Oct. 10, 2018 in corresponding application No. 16768474.5.

\* cited by examiner

*Primary Examiner* — John M Cooney
(74) *Attorney, Agent, or Firm* — Foley & Lardner LLP

(57) ABSTRACT

A railroad rail track pad composition including a particular ethylene·α-olefin·non-conjugated polyene random copolymer (A), clay (B), and a sulfur atom-containing silane coupling agent (C) is used in order to lower the viscosity of a rubber composition that is a raw material for molding while suppressing lowering of the rubber elasticity of a crosslinked and molded product to be obtained. In addition, a molded product obtained by crosslinking the composition, particularly a molded product obtained by crosslinking and foam-molding the composition, is provided with rubber elasticity that is suitable as a railroad rail track pad.

9 Claims, 1 Drawing Sheet

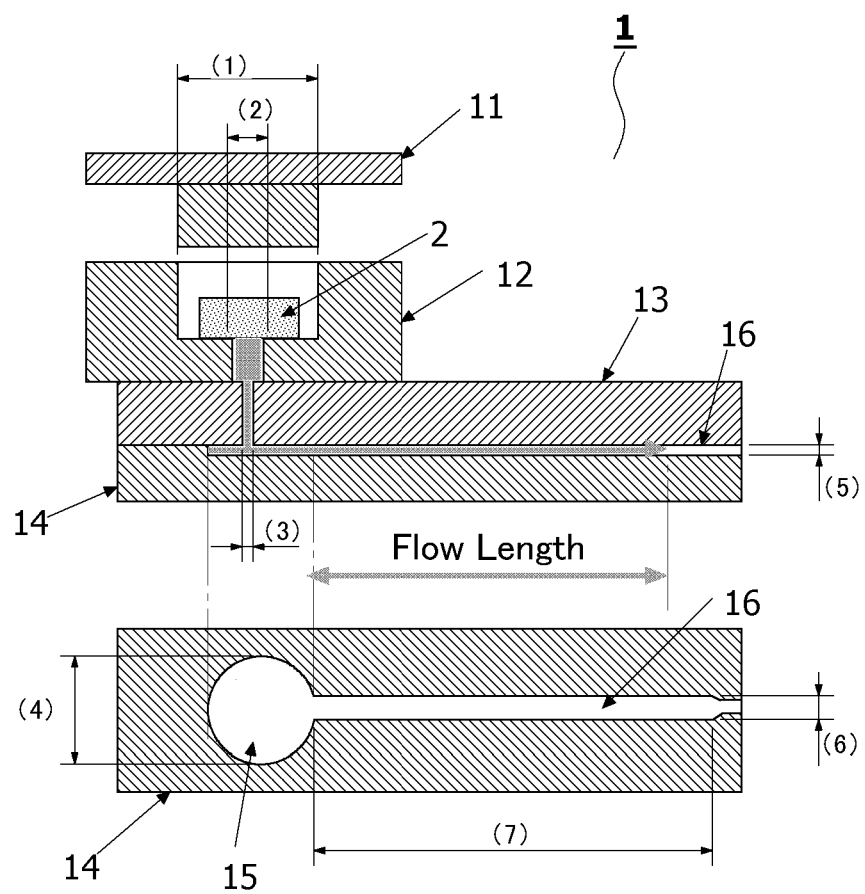

RAILROAD RAIL TRACK PAD COMPOSITION AND RAILROAD RAIL TRACK PAD

RELATED APPLICATIONS

This application is a national stage application under 35 U.S.C. § 371 of International Patent Application No. PCT/JP2016/057693, filed Mar. 11, 2016, which claims priority to Japanese Patent Application No. 2015-064039, filed Mar. 26, 2015, the disclosures of which are hereby incorporated by reference in their entireties.

TECHNICAL FIELD

The present invention relates to a railroad rail track pad composition and a railroad rail track pad obtained by crosslinking the composition.

BACKGROUND ART

As a vibration absorber for reducing vibration and noise that occur during the running of a railcar, a railroad pad is used in the track (rail) of a railroad. This railroad pad encompasses a track pad inserted between a rail and a tie, a tie pad laid under a tie, a track slab vibration absorber laid under a slab of a slab track, and the like.

Conventionally, as a material used for a railroad pad, an SBR-based non-foamed rubber has been used. In addition, a track pad composed of a crosslinked and foamed product using a specific ethylene•α-olefin•non-conjugated diene random copolymer having excellent physical properties, such as moderate elastic modulus, high tensile strength and elongation, and small compression set, and further having excellent processability is also proposed (Patent Literature 1).

Conventionally, a track pad for a railroad rail has generally been produced by filling a mold with a rubber composition (a tabular rubber material) and molding the rubber composition under pressurizing and heating conditions (Patent Literatures 2, 3).

CITATION LIST

Patent Literature

Patent Literature 1: International Publication No. WO 2013/137231
Patent Literature 2: JP2006-265841A
Patent Literature 3: JP2013-002256A

SUMMARY OF INVENTION

Technical Problem

It is clear that the productivity of a track pad is improved if the track pad can be formed by injection molding. In the case of an ethylene•propylene•diene copolymer rubber (EPDM)-based track pad, it is necessary to replace the EPDM with a low molecular weight rubber having a low viscosity or reduce the amount of a filler blended to make the fluidity of an uncrosslinked rubber composition high and suitable for injection molding. However, there has been a problem that these methods lower the rubber elasticity.

The present invention intends to provide a high-fluidity rubber composition, which is a raw material for molding, the viscosity of which is lowered while suppressing lowering of the rubber elasticity of a crosslinked and molded product to be obtained and which is also suitable for injection molding.

Solution to Problem

The present inventors have found that suppression of lowering the rubber elasticity of a crosslinked and molded product can be achieved while realizing a low viscosity by setting a specific combination of additives in a rubber composition.

Specifically, according to one aspect of the present invention, a railroad rail track pad composition comprising the following ethylene/α-olefin/non-conjugated polyene random copolymer (A), clay (B), and a sulfur atom-containing silane coupling agent (C) is provided.

An ethylene/α-olefin/non-conjugated polyene random copolymer (A) is:

a copolymer comprising structural units derived from ethylene [a], an α-olefin [b] having 3 to 20 carbon atoms, a non-conjugated polyene [c-1] comprising in a molecule only one partial structure represented by the following structural formula (I) or (II):

[Formula 1]

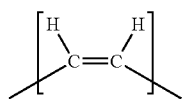
(I)

wherein (I) is a partial structure of a cyclic olefin,

[Formula 2]

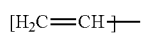
(II)

and a non-conjugated polyene [c-2] comprising in a molecule a total of two or more partial structures selected from the group consisting of structural formulae (I) and (II), and satisfying conditions of the following (1) to (6):

(1) the structural unit derived from the α-olefin [b] having 3 to 20 carbon atoms is present at 10 to 50 mole % in 100 mole % of all structural units, (2) a sum of a mole % of the structural unit derived from the non-conjugated polyene [c-1] and a mole % of the structural unit derived from the non-conjugated polyene [c-2] is 1.0 to 6.0 mole %, (3) a ratio of the mole % of the structural unit derived from the non-conjugated polyene [c-1] to the mole % of the structural unit derived from the non-conjugated polyene [c-2] ([c-1]/[c-2]) is 75/25 to 99.5/0.5, (4) Moony viscosity measured at 100° C. [$M_{1+4}$ (100° C.)] is 10 to 90, (5) an apparent iodine value of the structural unit derived from the non-conjugated polyene [c-2] is 0.1 to 3.0 g/100 g, and (6) the following formula (i) is satisfied:

$$50 > \text{activation energy of the flow } (Ea) \text{ [kJ/mol]} > 35 \quad \text{(i)}.$$

According to another aspect of the present invention, a railroad rail track pad obtained by crosslinking the above composition is provided.

Advantageous Effects of Invention

Even though a rubber composition according to the present invention is made to have a low viscosity where a good injection-moldability is exhibited, a crosslinked and molded product obtained exhibits good rubber elasticity required for a railroad rail track pad.

BRIEF DESCRIPTION OF DRAWING

FIG. 1 It is a drawing illustrating a mold for measuring flow length in Examples.

DESCRIPTION OF EMBODIMENTS

A railroad rail track pad composition according to the present invention will be specifically described below.

<Ethylene/α-Olefin/Non-Conjugated Polyene Random Copolymer (A)>

An ethylene/α-olefin/non-conjugated polyene random copolymer (A) (hereinafter referred to as copolymer (A)) used for the present invention is a copolymer containing structural units derived from ethylene [a], an α-olefin [b] having 3 to 20 carbon atoms, a non-conjugated polyene [c-1] containing in a molecule only one partial structure represented by the above structural formula (I) or (II), and a non-conjugated polyene [c-2] containing in a molecule a total of two or more partial structures selected from the group consisting of the above structural formulas (I) and (II), the copolymer satisfying conditions of the above (1) to (6). The above (1) to (6) are also described as requirements (1) to (6), respectively, herein.

<Component [b]>

Specific examples of the α-olefin [b] having 3 to 20 carbon atoms include propylene, 1-butene, 1-pentene, 1-hexene, 4-methyl-1-pentene, 1-heptene, 1-octene, 1-decene, 1-dodecene, 1-tetradecene, 1-hexadecene, and 1-eicosene. Among these, particularly α-olefins having 3 to 8 carbon atoms, such as propylene, 1-butene, 1-hexene, and 1-octene, are preferred. Such α-olefins are preferred because the raw material costs are relatively inexpensive, and the obtained copolymers exhibit excellent mechanical property.

The copolymer used in the present invention contains a constitutional unit derived from at least one α-olefin [b] having 3 to 20 carbon atoms and may contain constitutional units derived from two or more α-olefins [b] having 3 to 20 carbon atoms.

[Component [c-1]]

The non-conjugated polyene [c-1] containing in the molecule only one partial structure represented by the above structural formula (I) or (II) does not include, for example, aliphatic polyenes having vinyl groups ($CH_2=CH—$) at both ends of the molecule. Examples of the component [c-1] include aliphatic polyenes and alicyclic polyenes as described below.

Specific examples of the above aliphatic polyenes include 1,4-hexadiene, 1,5-heptadiene, 1,6-octadiene, 1,7-nonadiene, 1,8-decadiene, 1,12-tetradecadiene, 3-methyl-1,4-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 7-methyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, and 9-methyl-1,8-undecadiene. In the present invention, one of these aliphatic polyenes can be used, or two or more of these aliphatic polyenes can be used in combination. Preferably, 7-methyl-1,6-octadiene and the like are used.

Examples of the above alicyclic polyenes include polyenes composed of an alicyclic moiety having one carbon-carbon double bond (unsaturated bond) and a chain moiety (ethylidene, propylidene, or the like) bonded to a carbon atom constituting the alicyclic moiety by a carbon-carbon double bond. Specific examples include 5-ethylidene-2-norbornene (ENB), 5-propylidene-2-norbornene, and 5-butylidene-2-norbornene. 5-Ethylidene-2-norbornene (ENB) is preferably used. Specific examples of other alicyclic polyenes include 2-methyl-2,5-norbornadiene and 2-ethyl-2,5-norbornadiene.

The copolymer used in the present invention contains a constitutional unit derived from at least one component [c-1] and may contain constitutional units derived from two or more components [c-1].

[Component [c-2]]

Examples of the non-conjugated polyene [c-2] containing in the molecule a total of two or more partial structures selected from the group consisting of the above structural formulas (I) and (II) include alicyclic polyenes having an alicyclic moiety having a carbon-carbon double bond (unsaturated bond) and a chain moiety bonded to a carbon atom constituting the alicyclic moiety, the chain moiety containing a vinyl group, and aliphatic polyenes having vinyl groups at both ends of the molecule. Specific examples include 5-alkenyl-2-norbornenes, such as 5-vinyl-2-norbornene (VNB) and 5-allyl-2-norbornene; alicyclic polyenes, such as 2,5-norbornadiene, dicyclopentadiene (DCPD), norbornadiene, and tetracyclo$[4,4,0,1^{2.5},1^{7.10}]$deca-3,8-diene; and aliphatic polyenes, such as α,ω-dienes, such as 1,7-octadiene and 1,9-decadiene.

Among these, 5-vinyl-2-norbornene (VNB), 5-alkenyl-2-norbornenes, dicyclopentadiene, 2,5-norbornadiene, 1,7-octadiene, and 1,9-decadiene are preferred, and 5-vinyl-2-norbornene (VNB) is particularly preferred.

The copolymer used in the present invention contains a constitutional unit derived from at least one component [c-2] and may contain constitutional units derived from two or more components [c-2].

[Requirement (1)]

In the copolymer used in the present invention, the structural unit derived from the α-olefin [b] having 3 to 20 carbon atoms is present at 10 to 50 mole %, preferably 25 to 45 mole %, in 100 mole % of all structural units. The structural unit derived from the α-olefin [b] (mole %) being in the above range is preferred in terms of the flexibility and low temperature mechanical properties of a crosslinked and foamed product obtained from a rubber composition containing the copolymer. The above molar ratio can be determined by $^{13}$C-NMR.

[Requirement (2)]

In the copolymer (A) used in the present invention, the sum of the mole % of the structural unit derived from the non-conjugated polyene [c-1] and the mole % of the structural unit derived from the non-conjugated polyene [c-2] is 1.0 to 6.0 mole %, preferably 1.0 to 5.0 mole %. The above sum of mole % being in the above range is preferred because it is possible to relatively easily control the vulcanization reaction rate. The above sum of mole % can be obtained, for example, by totaling the molar amounts of ENB and VNB determined by $^{13}$C-NMR.

[Requirement (3)]

In the copolymer used in the present invention, the ratio of the mole % of the structural unit derived from the non-conjugated polyene [c-1] to the mole % of the structural unit derived from the non-conjugated polyene [c-2] ([c-1]/[c-2]) is 75/25 to 99.5/0.5, preferably 78/22 to 97/3. This mole % ratio being in the above range is preferred because the balance between vulcanization reactivity and gas retention properties during the foaming reaction is excellent. The mole % of each structural unit can be determined by $^{13}$C-NMR.

A copolymer (A1) obtained from ethylene, propylene, 5-ethylidene-2-norbornene (ENB), and 5-vinyl-2-norbornene (VNB) that is the copolymer (A) used in the present invention will be taken up as one example below, and a method for obtaining the requirements (1) to (3) will be specifically shown.

The structure (composition) analysis of an ethylene, propylene, and ENB copolymer by $^{13}$C-NMR is performed based on C. J. Carman, R. A. Harrington, and C. E. Wilkes, Macromolecules, 10, p 536-544 (1977), Masahiro Kakugo, Yukio Naito, Kooji Mizunuma, and Tatsuya, Miyatake, Macromolecules, 15, p 1150-1152 (1982), and G. Van der Velden, Macromolecules, 16, p 85-89 (1983). The structure analysis of a VNB-based copolymer is performed based on Harri Lasarov, Tuula T. Pakkanen, Macromol. Rapid Commun., 20, p 356-360 (1999), and Harri Lasarov*, Tuula T. Pakkanen, Macromol. Rapid Commun., 22, p 434-438 (2001).

First, the integral values of respective peaks derived from ethylene, propylene, ENB, and VNB are obtained by $^{13}$C-NMR.

1) Ethylene; [the integral value of a peak derived from the ethylene chain+{the integral value of a peak derived from the ethylene-propylene chain}/2]
2) Propylene; [the integral value of a peak derived from the propylene chain+{the integral value of a peak derived from the ethylene-propylene chain}/2]
3) ENB; the integral value of an ENB-position 3 peak
4) VNB; the integral value of a VNB-position 7 peak The chemical formulas of structures (E-form and Z-form) derived from ENB and the chemical formulas of structures (endo (n) and exo (x)) derived from VNB in the copolymer (A1) are shown below.

[Formula 3]

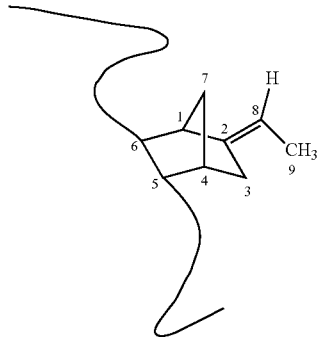

E-form

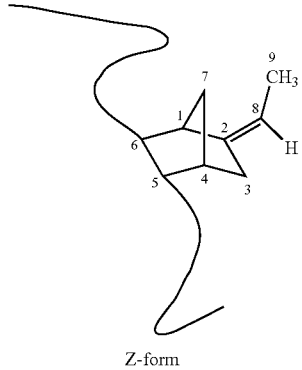

Z-form

[Formula 4]

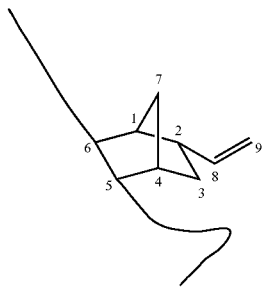

endo (n)

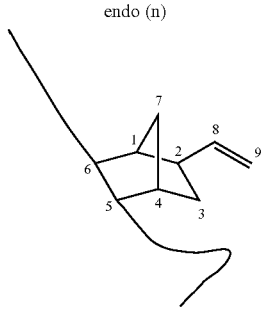

exo (x)

From the respective obtained integral values, the mole %s of the structural units derived from ENB and VNB are calculated. The conversion into % by mass is performed with the molecular weight of ethylene taken as 28.05, the molecular weight of propylene taken as 42.08, and the molecular weight of ENB and VNB taken as 120.2.

[Requirement (4)]

In the copolymer (A) used in the present invention, the Mooney viscosity measured at 100° C. [$ML_{1+4}$ (100° C.)] is 10 to 90. The above Mooney viscosity is preferably 10 to 80.

The Mooney viscosity being in the above range is preferred because the viscosity of a rubber compound that is a foaming medium can be relatively easily set low, and the design of a blend having excellent kneadability becomes possible.

The above Mooney viscosity can be measured according to JIS K6300 using a Mooney viscometer (model SMV202 manufactured by SHIMADZU CORPORATION).

[Requirement (5)]

In the copolymer used in the present invention, the apparent iodine value of the structural unit derived from the non-conjugated polyene [c-2] is 0.1 to 3.0 g/100 g. The above apparent iodine value of the component [c-2] is preferably 0.4 to 3.0 g/100 g, more preferably 0.5 to 3.0 g/100 g.

By adjusting the iodine value, a copolymer having an activation energy of the flow satisfying the requirement (6) described later can be obtained. In addition, the apparent iodine value of the non-conjugated polyene [c-2] being in the above range is preferred because the foaming properties and the kneading stability are excellent.

The above apparent iodine value of the non-conjugated polyene [c-2] can be determined by $^{1}$H-NMR and $^{13}$C-NMR.

A copolymer (A1) obtained from ethylene, propylene, 5-ethylidene-2-norbornene (ENB), and 5-vinyl-2-norbornene (VNB) that is the copolymer (A) of the present invention will be taken up as one example below, and a method for obtaining the apparent iodine value of VNB corresponding to the non-conjugated polyene [c-2] will be specifically shown.

First, the integral values of the structural units derived from ethylene, propylene, ENB (the position-3 peak), and VNB (the position-7 peak) in the copolymer are obtained from a $^{13}$C-NMR spectrum. From the ratio of obtained integral values, the molar ratio of the structural unit derived from ENB and the structural unit derived from VNB is calculated, and the % by mass of ENB is determined from the molecular weights of ethylene, propylene, ENB, and VNB.

Then, the integral value of a peak (a) derived from ENB and the integral value of a peak (c) derived from the vinyl group of VNB are obtained by a $^{1}$H-NMR spectrum in the manner as described below.

1) The integral value of the peak (a) derived from ENB:

[the sum of the integral values of a plurality of peaks around 4.7 to 5.3 ppm]−[the integral value of a peak (c)×2]

The plurality of peaks around 4.7 to 5.3 ppm include both the peak (a) and a peak (b). In the present invention, in order to obtain the integral value of the peak (a), the integral value of the peak (b) derived from two equivalent protons is regarded as twice the integral value of the peak (c) derived from one proton and is subtracted from the integral value of the plurality of peaks around 4.7 to 5.3 ppm.

2) The integral value of the peak (c) derived from the vinyl group of VNB: the sum of the integral values of peaks around 5.5 to 6.0 ppm The peaks (a), (b), and (c) in 1) and 2) represent (a), (b), and (c) in the following formulas (X) and (Y), respectively.

[Formula 5]

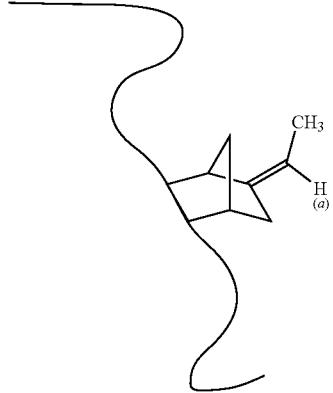

(X)

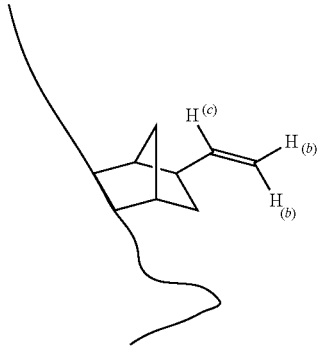

(Y)

The apparent iodine value ($IV_{(VNB)}$) of the structural unit derived from VNB (molecular weight 120.2) is calculated using the obtained integral values by the following formula. The molecular weight of iodine ($I_2$) is 253.81.

$IV_{(VNB)}$=[the integral value of the peak (c) derived from the vinyl group of VNB]/[the integral value of the peak (a) derived from ENB]×[the % by mass of ENB obtained from the $^{13}$C-NMR spectrum]×253.81/120.2

[Requirement (6)]

The copolymer (A) used in the present invention satisfies the following formula (i), preferably the following formula (i').

50>activation energy of the flow ($Ea$) [kJ/mol]>35  (i)

50>activation energy of the flow ($Ea$) [kJ/mol]>37  (i')

It is known that generally, the viscosity of a polymer melt decreases with temperature increase like the viscosity of a rheologically simple liquid, and at high temperature (Tg; glass transition temperature+100° C.), the temperature dependence of the viscosity follows an Arrhenius type equation represented by the following formula (j).

viscosity ($\eta o$)=$A$exp($Ea/RT$)  (j)

R; gas constant, A; frequency factor, Ea; activation energy of the flow, T; absolute temperature The above activation energy of the flow does not depend on the molecular weight and the molecular weight distribution and is affected only by the molecular structure and therefore considered as a useful indicator representing the structural information of the polymer.

However, for olefinic polymers obtained using Ziegler catalysts, precise molecular structure control is difficult, and activation energy of the flow including various types of structural information is calculated. In recent years, due to the discovery of metallocene catalysts and advances in production techniques, it has become possible to control even the molecular weight distribution, the degree of short chain branching, the composition distribution, and the degree of long chain branching, and it has been reported that the activation energy of the flow of high density polyethylene (HDPE) is about 27 kJ/mol, and the activation energy of the flow of low density polyethylene (LDPE) is about 56 kJ/mol.

The difference in activation energy of the flow here is considered to be due to long chain branching. For the analysis of long chain branching, evaluation methods by NMR and light scattering are known, but accurate detection is difficult, and studies focusing on rheological properties are still actively performed (Reference Literature 1; Masayuki Yamaguchi, Seikei-Kakou, Vol. 20, No. 7, 400-404 (2008), Reference Literature 2; F. J. Stadler, C. Gabriel, H. Munstedt, Macromolecular chemistry and Physics, 208, 2449-2454 (2007)).

On the other hand, it is reported that also for an EPDM, the distribution of the diene component copolymerized as a crosslinking site is made uniform by using a metallocene catalyst (Reference Literature 3; B. A. Harrington, M. G. Williams, Presented at a meeting of the Rubber Division, American Chemical Society Oct. 14-17, 2003.

Therefore, by using a metallocene catalyst, the precise molecular structure control of an EPDM and making crosslinking reactivity uniform become possible, and it is possible to grasp the relationship between activation energy of the flow and the physical properties of a rubber composition or a crosslinked and foamed product and clearly show a structural region exhibiting an excellent function in the highly foamed region.

Generally, in order to produce a crosslinked and foamed product by crosslinking and foam-molding a composition containing an ethylene/propylene/diene copolymer rubber (EPDM), it is important to control the properties and condition of the composition and the vulcanization reaction and the foaming reaction.

For example, when the viscosity of the composition is too low, the foaming gas retention properties are poor, and lower specific gravity cannot be achieved, and further, a deterioration in appearance is caused. On the other hand, when the viscosity of the composition is too high, it is not foamed. In addition, one example of a factor that affects the viscosity of the composition includes network formation by the crosslinking reaction of the EPDM, and the control of the crosslinking reaction is also important.

Therefore, conventionally, in order to improve the foaming gas retention properties under a condition in which the viscosity of the composition is lowered, studies have been performed to perform molecular design so that the molecular weight distribution of the EPDM is wide, and improve the gas retention properties with the high molecular weight component. On the other hand, studies to introduce long chain branching into a polymer to improve the gas retention properties are well known for polyethylene. But, in an EPDM using a conventional Ziegler catalyst, the introduction of long chain branching itself is difficult. Further, with the Ziegler catalyst, it is difficult to uniformly introduce the diene component into the polymer, and a crosslinking reaction is unevenly distributed, and as a result, it is difficult to obtain a sufficient highly foamed product.

Therefore, the copolymer (A) used in the present invention is preferably synthesized using a metallocene catalyst to uniformly introduce the diene component into the polymer to control the crosslinking reaction. In addition, the component [c-2], such as 5-vinyl-2-norbornene (VNB), is copolymerized as one diene component to introduce more long chain branching. Its structural properties are specified by activation energy of the flow. With a crosslinked and foamed product obtained by crosslinking and foaming a composition containing the copolymer (A) in which the activation energy of the flow satisfies the above formula (i), it becomes possible to easily and stably perform the production of a highly foamed product, which has so far been difficult to achieve. In addition, the crosslinked and foamed product obtained with the composition containing the copolymer (A) exhibits significantly excellent surface smoothness.

The activation energy of the flow (Ea) of the copolymer used in the present invention is a numerical value calculated by the Arrhenius type equation from a shift factor (aT) when a master curve showing the frequency (unit; Hz) dependence of melt complex viscosity (unit; Pa·sec) at 190° C. is prepared based on the temperature-time superposition principle, and is obtained by the method shown below.

A linear approximate expression of [ln(aT)] with [1/(T+273.16)] (the following formula (1)) is calculated by the least squares method from a shift factor (aT) at each temperature (T) obtained when the melt complex viscosity-frequency curve (the unit of melt complex viscosity; Pa/sec, the unit of frequency; Hz) of the copolymer at each temperature of 170° C. and 210° C. (T, unit; ° C.) is superposed on the melt complex viscosity-frequency curve of the copolymer at 190° C. based on the temperature-time superposition principle for each melt complex viscosity-frequency curve at each temperature (T). Next, Ea is obtained from the gradient "m" of the linear approximate expression and the following formula (2).

$$\ln(aT) = m(1/(T+273.16)) + n \quad (1)$$

$$Ea = [0.008314 \times m] \quad (2)$$

aT: shift factor, Ea: activation energy of the flow (unit; kJ/mol)

T: temperature (unit; ° C.), n: intercept

The above-described calculation is conducted by using, for example, a commercially available calculation software such as RSI Orchestrator VER. 6.6.3: produced by TA Instruments Japan Inc.

The shift factor (aT) is the amount of movement in the case where the log-log curve of the melt complex viscosity-frequency at each temperature (T) is shifted in the axis direction of the log(Y)=−log(X) (provided that the Y axis indicates melt complex viscosity, and the X axis indicates frequency) and is superposed on the melt complex viscosity-frequency curve at 190° C. In the superposition, for the log-log curve of the melt complex viscosity-frequency at each temperature (T), the frequency is shifted aT times and the melt complex viscosity is shifted 1/aT times for each curve, and the correlation coefficient when the formula (1) is obtained from the values at three points of 170° C., 190° C., and 210° C. by the least squares method is usually 0.99 or more.

For the measurement of the melt complex viscosity-frequency curve, measurement is performed using a viscoelasticity measuring apparatus (for example, a viscoelasticity tester (model RDS-2) manufactured by Rheometric). Specifically, as a specimen, one obtained by molding into the shape of a diameter 25 mm×2 mm thick disk from a 2 mm thick sheet obtained by pressing the copolymer at 190° C. is used, and measurement is performed under the following conditions. As data processing software, RSI Orchestrator VER. 6.6.3 (manufactured by TA Instruments Japan Inc.) is used. In addition, an appropriate amount (for example, 1000 ppm) of an antioxidant is preferably previously blended into the measurement specimen.

Geometry: parallel plate
Measurement temperature: 170° C., 190° C., and 210° C.
Frequency: 0.5 to 79.577 Hz
Distortion factor: 1.0%

The frequency dependence of viscosity is measured under the above conditions, and the above-described Arrhenius plot is derived to calculate the activation energy of the flow.

The copolymer used in the present invention is a copolymer synthesized using a metallocene catalyst as described above. In the present invention, as the metallocene catalyst, a catalyst represented by the following formula (III), (IV), or (V) is preferred.

The compound represented by formula (III) will be described.

[Formula 6]

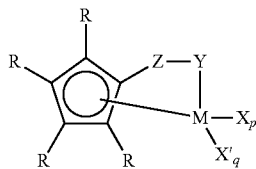

(III)

wherein R is each independently a group selected from hydrocarbyls, halohydrocarbyls, silyls, germyls, and combinations thereof, or a hydrogen atom, and the number of atoms other than hydrogen that the group contains is 20 or less.

M is titanium, zirconium, or hafnium.
Y is —O—, —S—, —NR*—, or —PR*—.
R* is a hydrogen atom, a hydrocarbyl group, a hydrocarbyloxy group, a silyl group, a halogenated alkyl group, or a halogenated aryl group, and when R* is not hydrogen, R* includes up to 20 atoms excluding hydrogen.

Z is a divalent group containing boron or a group 14 element and, in addition, containing nitrogen, phosphorus, sulfur, or oxygen, and the number of atoms included in the divalent group is 60 or less excluding hydrogen.

X is each independently an anionic ligand in which the number of atoms is 60 or less (excluding a cyclic ligand in which π electrons are delocalized.) when a plurality of Xs are present.

X' is each independently a neutral linking compound in which the number of atoms is 20 or less when a plurality of X's are present.

The letter p is 0, 1, or 2.
The letter q is 0 or 1.

In the case where p takes on 2 and q takes on 0, M is in an oxidized state of +4, X is an anionic ligand selected from halide, hydrocarbyl, hydrocarbyloxy, di(hydrocarbyl)amide, di(hydrocarbyl) phosphide, hydrocarbyl sulfide, and silyl groups, and halo-substituted derivatives, di(hydrocarbyl) amino-substituted derivatives, hydrocarbyloxy-substituted derivatives, and di(hydrocarbyl)phosphino-substituted derivatives thereof, and the number of atoms other than hydrogen atoms in the X is 20 or less. In addition, in the case where p takes on 1 and q takes on 0, M is in an oxidized state of +3, and X is an anionic stabilizing ligand selected from allyl, 2-(N,N'-dimethylaminomethyl)phenyl, and 2-(N,N'-dimethyl)aminobenzyl, or M is in an oxidation state of +4, and X is a divalent conjugated diene derivative and forms a metallacyclopentene with M. In addition, in the case where p takes on 0 and q takes on 1, M is in an oxidation state of +2, and X' is a neutral conjugated or non-conjugated diene that may be substituted by one or more hydrocarbyl groups, and contains 40 or less carbon atoms and forms a π complex with M.

The compound represented by formula (IV) will be described.

[Formula 7]

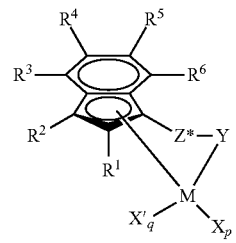

(IV)

wherein $R^1$ and $R^2$ represent independently a hydrogen atom or an alkyl group having 1 to 6 carbon atoms, and at least one of $R^1$ and $R^2$ is not a hydrogen atom. $R^3$ to $R^6$ represent independently a hydrogen atom or an alkyl group having 1 to 6 carbon atoms.

In addition, $R^1$ to $R^6$ may be bonded to each other so as to form a ring.

M represents titanium.
Y represents —O—, —S—, —NR*—, or —PR*—.
Z* represents $SiR*_2$, $CR*_2$, $SiR*_2SiR*_2$, $CR*_2CR*_2$, $CR*=CR*$, $CR*_2SiR*_2$, or $GeR*_2$.

R* represents independently a hydrogen atom, a hydrocarbyl group, a hydrocarbyloxy group, a silyl group, a halogenated alkyl group, or a halogenated aryl group, and when R* is not hydrogen, R* includes up to 20 atoms other than hydrogen. Two R*s (when R*s are not hydrogen) bonded to Z* may form a ring, or R* bonded to Z* and R* bonded to Y may form a ring.

The letter p is 0, 1, or 2.
The letter q is 0 or 1.

With the proviso that, in the case where p takes on 2, q is 0, and M is in an oxidized state of +4, and X is each independently a methyl group or a benzyl group. In addition, in the case where p takes on 1, q is 0, and M is in an oxidized state of +3, and X is a 2-(N,N'-dimethyl)aminobenzyl group, or q is 0, and M is in an oxidation state of +4, and X is 1,3-butadienyl. In addition, in the case where p takes on 0, q is 1, and M is in an oxidation state of +2, and X is 1,4-diphenyl-1,3-butadiene, 2,4-hexadiene, or 1,3-pentadiene.

The compound represented by formula (V) will be described.

[Formula 8]

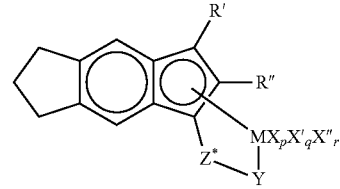

(V)

wherein R' represents a hydrogen atom, a hydrocarbyl group, a di(hydrocarbylamino) group, or a hydrocarbyleneamino group, and the number of carbon atoms when the above R' has carbon atoms is 20 or less.

In formula (V), R" represents a hydrocarbyl group having 1 to 20 carbon atoms or a hydrogen atom.

In formula (V), M represents titanium.

In formula (V), Y represents —O—, —S—, —NR*—, —PR*—, —NR$_2$*, or —PR$_2$*.

In formula (V), Z* represents —SiR*$_2$—, —CR*$_2$—, —SiR*$_2$SiR*$_2$—, —CR*$_2$CR*$_2$—, —CR*=CR*—, —CR*$_2$SiR*$_2$—, or —GeR*$_2$—.

The above R* is each independently a hydrogen atom or a group containing at least one selected from the group consisting of hydrocarbyls, hydrocarbyloxys, silyls, alkyl halides, and aryl halides when a plurality of R*s are present, the above R* contains an atom having an atomic number of 2 to 20, and optionally, two R*s (when R*s are not a hydrogen atom) included in Z* may form a ring, or R* in Z* and R* in Y may form a ring.

In formula (V), X represents a monovalent anionic ligand in which the number of atoms is 60 or less, excluding a cyclic ligand in which π electrons are delocalized. X' represents a neutral linking group in which the number of atoms is 20 or less. X" represents a divalent anionic ligand in which the number of atoms is 60 or less. The letter p is 0, 1, or 2. The letter q is 0 or 1. The letter r is 0 or 1.

In the case where p takes on 2, q and r are 0, M is in an oxidized state of +4 (where the case, in which Y is —NR*$_2$ or —PR*$_2$, is excluded) or M is in an oxidized state of +3 (where Y is —NR*$_2$ or —PR*$_2$), and X is an anionic ligand selected from the group consisting of a halide group, a hydrocarbyl group, a hydrocarbyloxy group, a di(hydracarbyl)amide group, a di(hydrocarbyl)phosphide group, a hydrocarbyl sulfide group, a silyl group, halogen-substituted groups of these groups, di(hydrocarbyl)amino-substituted groups of these groups, hydrocarbyloxy-substituted groups of these groups, and di(hydrocarbyl)phosphino-substituted groups of these groups while the above-described groups include atoms of the atomic number of 2 to 30.

In the case where r takes on 1, p and q are 0, M is in an oxidized state of +4, X" is a dianionic ligand selected from the group consisting of a hydrocarbazyl group, an oxyhydrocarbyl group, and a hydrocarbylenedioxy group, and X" described above includes atoms of the atomic number of 2 to 30. In the case where p takes on 1, q and r are 0, M is in an oxidized state of +3, and X is an anionic stabilizing ligand selected from the group consisting of allyl, 2-(N,N-dimethylamino)phenyl, 2-(N,N-dimethylaminomethyl)phenyl, and 2-(N,N-dimethylamino)benzyl. In the case where p and r take on 0, q is 1, M is in an oxidized state of +2, X' is a neutral conjugated diene or a neutral diconjugated diene substituted with at least one hydrocarbyl group optionally, and X" described above has the number of carbon atoms of 40 or less and forms a bond with M through π-π interaction.

As for more preferable embodiments, in formula (V), in the case where p takes on 2 and q and r take on each 0, M is in an oxidation state of +4, and each of X is independently methyl, benzyl, or a halide. In the case where p and q take on each 0, r is 1, and M is in an oxidation state of +4, and X" is a 1,4-butadienyl group, which forms a metallacyclopentene ring with M. In the case where p takes on 1, q and r are each 0, and M is in an oxidation state of +3, and X is 2-(N,N-dimethylamino)benzyl. In the case where p and r take on each 0, q is 1, and M is in an oxidation state of +2, and X is 1,4-diphenyl-1,3-butadiene or 1,3-pentadiene.

Among formula (V), a compound represented by the following formula (V') is particularly preferred.

[Formula 9]

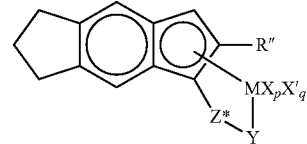

(V')

wherein R' is a hydrogen atom or a hydrocarbyl group having 1 to 20 carbon atoms, R" is a hydrocarbyl group having 1 to 20 carbon atoms or a hydrogen atom, M is titanium, Y is —NR*—, Z* is —SiR*$_2$—, the above R* is each independently a hydrogen atom or a hydrocarbyl group having 1 to 20 carbon atoms, one of p and q is 0, and the other is 1; when p is 0 and q is 1, M is in the +2 oxidation state, and X is 1,4-diphenyl-1,3-butadiene or 1,3-pentadiene; and when p is 1 and q is 0, M is in the +3 oxidation state, and X is 2-(N,N-dimethylamino)benzyl.

Examples of the hydrocarbyl group having 1 to 20 carbon atoms include linear alkyl groups, such as a methyl group, an ethyl group, and a butyl group, and branched alkyl groups, such as a t-butyl group and a neopentyl group. Examples of the hydrocarbyloxy groups include linear alkyloxy groups, such as a methyloxy group, an ethyloxy group, and a butyloxy group, and branched alkyloxy groups, such as a t-butyloxy group and a neopentyloxy group. Examples of the halogenated alkyl groups include those obtained by chlorinating, brominating, or fluorinating the above linear alkyl groups and branched alkyl groups. Or examples of the halogenated aryl groups include a phenyl chloride group and a naphthyl chloride group.

In the above formula (V'), R" is preferably a hydrogen atom or methyl and is preferably methyl.

Particularly preferred catalysts are (t-butylamido) dimethyl (η$^5$-2-methyl-s-indacen-1-yl) silane titanium$^{(II)}$ 2,4-hexadiene (the following formula (VI)), (t-butylamido)-dimethyl (η$^5$-2-methyl-s-indacen-1-yl) silane titaniumm$^{(IV)}$ dimethyl (the following formula(VII)), (t-butylamido)-dimethyl (η$^5$-2,3-dimethylindenyl) silane titanium$^{(II)}$ 1,4-diphenyl-1,3-butadiene (the following formula (VIII)), (t-butylamido)-dimethyl (η$^5$-2,3-dimethyl-s-indacen-1-yl) silane titanium$^{(IV)}$ dimethyl (the following formula (IX)), and (t-butylamido)-dimethyl (η$^5$-2-methyl-s-indacen-1-yl) silane titanium$^{(II)}$ 1,3-pentadiene (the following formula (X)).

Among them, (t-butylamido)-dimethyl (η$^5$-2-methyl-s-indacen-1-yl) silane titanium$^{(II)}$ 1,3-pentadiene (the following formula (X)) is particularly preferred.

[Formula 10]

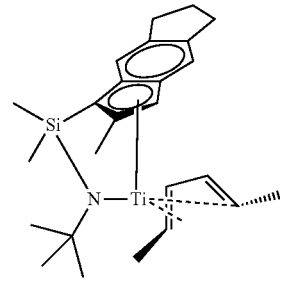

(VI)

-continued

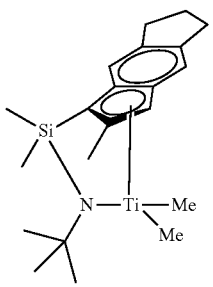

(VII)

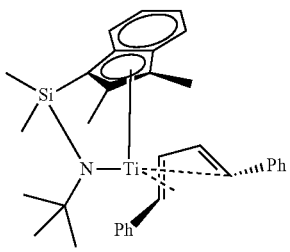

(VIII)

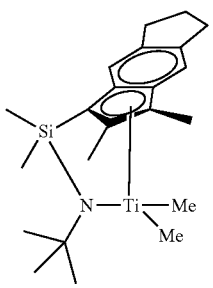

(IX)

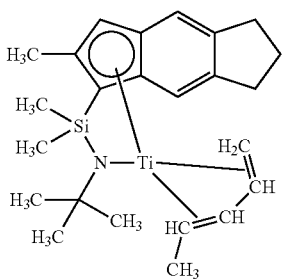

(X)

Particularly, when the catalyst having the structure represented by the above formula (X) is used, the polymerization reaction for obtaining the copolymer (A) used in the present invention is excellent in copolymerizability of the non-conjugated polyenes (the component [c-1] and the component [c-2]), for example, a double bond at a VNB end can be efficiently incorporated, and long chain branching can be introduced in a high proportion. In addition, when this catalyst is used, the molecular weight distribution and composition distribution of the obtained copolymer are narrow, and a copolymer having a very uniform molecular structure can be prepared. Therefore, the formation of a gel-like material on a rubber molded product surface, which is feared with long chain branching formation, is significantly suppressed. As a result, the rubber molded product containing such a copolymer contains no gel-like blob and therefore is excellent in its surface appearance. In addition, it is excellent in shape retention properties and therefore also has good production stability.

These catalysts can be prepared using well-known synthesis methods. For example, a synthesis method is disclosed in WO98/49212.

<Method for Producing Copolymer (A)>

When the copolymer (A) used in the present invention is prepared, a metallocene catalyst, preferably a catalyst having a structure illustrated above, is used. More particular examples include a continuous method or a batch method using the above catalyst as a main catalyst, a boron-based compound and/or an organoaluminum compound, such as a trialkyl compound, as a cocatalyst, an aliphatic hydrocarbon, such as hexane, as a solvent, and a reactor with a stirrer.

Examples of the boron-based compound include trimethylammonium tetrakis(pentafluorophenyl) borate, di(hydrogenated tallow alkyl)methylammonium tetrakis(pentafluorophenyl) borate, triethylammonium tetrakis(pentafluorophenyl) borate, tripropylammonium tetrakis(pentafluorophenyl) borate, tri(n-butyl)ammonium tetrakis(pentafluorophenyl) borate, tri(sec-butyl)ammonium tetrakis(pentafluorophenyl) borate, N,N-dimethylanilinium tetrakis(pentafluorophenyl) borate, N,N-dimethylanilinium n-butyltris(pentafluorophenyl) borate, N,N-dimethylanilinium benzyltris(pentafluorophenyl) borate, N,N-dimethylanilinium tetrakis(4-(t-butyldimethylsilyl)-2,3,5,6-tetrafluorophenyl) borate, N,N-dimethylanilinium tetrakis(4-(triisopropylsilyl)-2,3,5,6-tetrafluorophenyl) borate, N,N-dimethylanilinium pentafluorophenoxytris(pentafluorophenyl) borate, N,N-diethylanilinium tetrakis(pentafluorophenyl) borate, N,N-dimethyl-2,4,6-trimethylanilinium tetrakis(pentafluorophenyl) borate, trimethylammonium tetrakis(2,3,4,6-tetrafluorophenyl) borate, triethylammonium tetrakis(2,3,4,6-tetrafluorophenyl) borate, tripropylammonium tetrakis(2,3,4,6-tetrafluorophenyl) borate, N,N-dimethylanilinium tetrakis(2,3,4,6-tetrafluorophenyl) borate, N,N-diethylanilinium tetrakis(2,3,4,6-tetrafluorophenyl) borate, and N,N-dimethyl-2,4,6-trimethylanilinium tetrakis(2,3,4,6-tetrafluorophenyl) borate; dialkylammonium salts, for example, di-(i-propyl)ammonium tetrakis(pentafluorophenyl) borate, tri(n-butyl)ammonium tetrakis(2,3,4,6-tetrafluorophenyl) borate, dimethyl(t-butyl)ammonium tetrakis(2,3,4,6-tetrafluorophenyl) borate, and dicyclohexylammonium tetrakis(pentafluorophenyl) borate; trisubstituted phosphonium salts, for example, triphenylphosphonium tetrakis(pentafluorophenyl) borate, tri(o-tolyl)phosphonium tetrakis(pentafluorophenyl) borate, and tri(2,6-dimethylphenyl)phosphonium tetrakis(pentafluorophenyl) borate; disubstituted oxonium salts, for example, diphenyloxonium tetrakis(pentafluorophenyl) borate, di-(o-tolyl)oxonium tetrakis(pentafluorophenyl) borate, and di(2,6-dimethylphenyl)oxonium tetrakis(pentafluorophenyl) borate; and disubstituted sulfonium salts, for example, diphenylsulfonium tetrakis(pentafluorophenyl) borate, di(o-tolyl)sulfonium tetrakis(pentafluorophenyl) borate, and bis(2,6-dimethylphenyl)sulfonium tetrakis(pentafluorophenyl) borate.

As the organoaluminum compound, triisobutylaluminum (hereinafter also referred to as "TIBA") is mentioned.

The reaction temperature can be raised to 100° C. because the catalyst is not deactivated even at high temperature. The polymerization pressure is in a range of higher than 0 and 8 MPa or less (gauge pressure), preferably higher than 0 and 5 MPa or less (gauge pressure). In addition, the reaction time (average residence time when copolymerization is carried out by the continuous method) is usually 0.5 minutes to 5 hours, preferably 10 minutes to 3 hours, though different depending on conditions, such as catalyst concentration and polymerization temperature. Further, in copolymerization, a molecular weight-adjusting agent, such as hydrogen, can also be used.

The molar (charge) ratio of the ethylene [a] to the above α-olefin [b] ([a]/[b]) is 25/75 to 80/20, preferably 30/70 to 70/30.

The molar (charge) ratio of the above non-conjugated polyene [c-1] to the above non-conjugated polyene [c-2] ([c-1]/[c-2]) is 60/40 to 99.5/0.5, preferably 65/35 to 99/1.

The molar (charge) ratio of the ethylene [a] to the non-conjugated polyene [c-1] ([a]/[c-1]) is 70/30 to 99/1, preferably 80/20 to 98/2.

The molar (charge) ratio of the ethylene [a] to the non-conjugated polyene [c-2] ([a]/[c-2]) is 70/30 to 99.9/0.1, preferably 80/20 to 99.5/0.5.

Thus obtained copolymer (A) used in the present invention includes the structural unit derived from the α-olefin [b] having 3 to 20 carbon atoms with 10 to 50 mole %, preferably 25 to 45 mole %, in 100 mole % of all structural units. In addition, the sum of the mole % of the structural unit derived from the non-conjugated polyene [c-1] and the mole % of the structural unit derived from the non-conjugated polyene [c-2] is 1.0 to 6.0 mole %, more preferably 1.0 to 5.0 mole %. Among the carbon-carbon double bonds, the ratio of the mole % of the structural unit derived from the non-conjugated polyene [c-1] to the mole % of the structural unit derived from the non-conjugated polyene [c-2] ([c-1]/[c-2]) is 75/25 to 99.5/0.5, preferably 78/22 to 97/3.

<Railroad Rail Track Pad Composition>

A railroad rail track pad composition (hereinafter referred to as rubber composition) according to the present invention includes the above copolymer (A), clay (B), and a sulfur atom-containing silane coupling agent (C), and may preferably include, for example, a reinforcing agent such as carbon black, a softening agent such as an oil, a vulcanizing agent and a vulcanization aid, and a foaming agent and a foaming aid though other components are not particularly limited.

The present inventors infer that in the rubber composition according to the present invention, an alkoxy group included in the sulfur atom-containing silane coupling agent (C) forms a hydrogen bond with the surface of the clay (B), and in addition, the sulfur atom of the silane coupling agent (C) strengthens the interaction between the copolymer (A) and the clay (B), particularly the interaction during vulcanization, to increase the elasticity of the rubber composition.

The content of the above copolymer (A) in the entire rubber composition is preferably 20% by mass or more. The clay (B) in the entire rubber composition is used in the proportion of preferably 5 to 200 parts by mass, more preferably 30 to 100 parts by mass, based on 100 parts by mass of the copolymer (A). The sulfur atom-containing silane coupling agent (C) is used in the proportion of preferably 0.1 to 10 parts by mass, more preferably 0.5 to 3 parts by mass, based on 100 parts by mass of the copolymer (A).

[Clay (B)]

Clay refers to a white powdery product industrially purified from a natural ore that contains hydrated aluminum silicate as a main component, and particularly in the present invention, products sold on the market as clay for rubber can be used preferably. Among those, clay that is surface-treated with a silane coupling agent, for example, "BURGESS KE", trade name, manufactured by Burgess Pigment Company is particularly preferred.

[Sulfur Atom-Containing Silane Coupling Agent (C)]

The silane coupling agent (C) is a silane coupling agent containing at least one sulfur atom in the molecule.

Specific examples of such a silane coupling agent (C) include sulfur-based silane coupling agents having one or more structures selected from mercapto groups and sulfides, such as bis(3-triethyoxysilylpropyl)trisulfide, bis(2-triethoxysilylethyl)tetrasulfide, bis(3-trimethoxysilylpropyl)tetrasulfide, bis(2-trimethoxysilylethyl)tetrasulfide, bis(triethoxysilylpropyl)tetrasulfide, 3-mercaptopropyltrimethoxysilane, 3-mercaptopropyltriethoxysilane, 3-mercaptopropylmethyldimethoxysilane, and 3-mercaptopropylmethyldiethoxysilane.

[Carbon Black]

The carbon black is used in the proportion of 30 to 300 parts by mass, preferably 50 to 200 parts by mass, further preferably 61 to 200 parts by mass, and most preferably 80 to 200 parts by mass, based on 100 parts by mass of the copolymer (A) in order to obtain a rubber composition that can provide a vulcanized rubber molded product having sufficient mechanical strength.

As the carbon black, SRF, GPF, FEF, MAF, HAF, ISAF, SAF, FT, MT, and the like can be used. The carbon black preferably has a nitrogen adsorption specific surface area of 10 to 100 $m^2/g$ in terms of obtaining a rubber composition that can provide a vulcanized rubber molded product having good mechanical strength and a good product surface.

Conventionally known additives, such as a rubber-reinforcing agent other than carbon black, an inorganic filler other than the clay (B), a softening agent, an anti-aging agent, a processing aid, a foaming agent, a foaming aid, a vulcanization accelerator, an organic peroxide, a vulcanization aid, a coloring agent, a dispersing agent, and a flame retardant, can be blended into the rubber composition according to the present invention in a range that does not impair the object and advantageous effects of the present invention.

The above rubber-reinforcing agent is effective in increasing the mechanical property, such as tensile strength, tear strength, and wear resistance, of a crosslinked (vulcanized) rubber. Specific examples of such a rubber-reinforcing agent include fine powder silicic acid and silica. These may be previously subjected to silane coupling treatment.

Specific examples of the silica include fumed silica and precipitated silica. These silicas may be surface-treated with a reactive silane, such as mercaptosilane, aminosilane, hexamethyldisilazane, chlorosilane, or alkoxysilane, a low molecular weight siloxane, or the like.

The type of these rubber-reinforcing agents and the amount of these rubber-reinforcing agents blended can be appropriately selected according to the application. The amount of the rubber-reinforcing agent (excluding carbon black) blended is usually 150 parts by mass at the maximum, preferably 100 parts by mass at the maximum, based on 100 parts by mass of the copolymer (A). It is preferred not to use a rubber-reinforcing agent excluding carbon black in injection molding.

[Inorganic Filler]

In the present invention, other inorganic fillers, for example, light calcium carbonate, heavy calcium carbonate, talc and the like, may be added in addition to the clay (B) in a range that does not impair the advantageous effects of the present invention.

The type of these inorganic fillers and the amount of these inorganic fillers blended can be appropriately selected according to the application. The amount of the inorganic filler blended is usually 300 parts by mass at the maximum, preferably 200 parts by mass at the maximum, based on 100 parts by mass of the copolymer (A).

[Softening Agent]

As the above softening agent, softening agents usually used in rubbers can be used. Specific examples of the softening agent include petroleum-based softening agents, such as process oils, lubricating oils, paraffin oils, liquid paraffin, petroleum asphalts, and Vaseline; coal tar-based softening agents, such as coal tars and coal tar pitches; fatty oil-based softening agents, such as castor oil, linseed oil, rapeseed oil, soybean oil, and coconut oil; tall oil; factice; waxes, such as beeswax, carnauba wax, and lanolin; fatty acids and fatty acid salts, such as ricinoleic acid, palmitic acid, stearic acid, barium stearate, calcium stearate, and zinc laurate; naphthenic acid; pine oil, rosin, or derivatives thereof; synthetic polymer substances, such as terpene resins, petroleum resins, atactic polypropylene, and coumarone-indene resins; ester-based softening agents, such as dioctyl phthalate, dioctyl adipate, and dioctyl sebacate; microcrystalline waxes, liquid polybutadiene, modified liquid polybutadiene, liquid Thiokol, and hydrocarbon-based synthetic lubricating oils. Among them, petroleum-based softening agents, particularly process oils, are preferably used. The amount of these softening agents blended is appropriately selected according to the application of the vulcanizate.

[Anti-Aging Agent]

Examples of the above anti-aging agent include amine-based, hindered phenol-based, or sulfur-based anti-aging agents. These anti-aging agents are used in a range that does not impair the object of the present invention, as described above. Examples of the amine-based anti-aging agents include diphenylamines and phenylenediamines. As the sulfur-based anti-aging agents, sulfur-based anti-aging agents usually used in rubbers are used.

[Processing Aid]

As the above processing aid, processing aids used in usual rubber processing can be used. Specific examples of the processing aid include higher fatty acids, such as linoleic acid, ricinoleic acid, stearic acid, palmitic acid, and lauric acid; salts of higher fatty acids, such as barium stearate, zinc stearate, and calcium stearate; and esters of the above higher fatty acids. Such a processing aid is usually used in the proportion of 10 parts by mass or less, preferably 5 parts by mass or less, based on 100 parts by mass of the copolymer (A). It is desired to appropriately determine the optimum amount according to the required physical property values.

[Foaming Agent]

Specific examples of the foaming agent include inorganic foaming agents, such as sodium bicarbonate (baking soda), sodium carbonate, ammonium bicarbonate, ammonium carbonate, and ammonium nitrite; nitroso compounds, such as N,N'-dimethyl-N,N'-dinitrosoterephthalamide and N,N'-dinitrosopentamethylenetetramine (DPT); azo compounds, such as azodicarbonamide (ADCA), azobisisobutyronitrile (AZBN), azobiscyclohexylnitrile, azodiaminobenzene, and barium azodicarboxylate; sulfonyl hydrazide compounds, such as benzenesulfonyl hydrazide (BSH), toluenesulfonyl hydrazide (TSH), p,p'-oxybis(benzenesulfonyl hydrazide) (OBSH), and diphenyl sulfone-3,3'-disulfonyl hydrazide; and azide compounds, such as calcium azide, 4,4'-diphenyldisulfonyl azide, and p-toluenesulfonyl azide.

These foaming agents are usually used in the proportion of 0.5 to 30 parts by mass, preferably 1 to 20 parts by mass, based on 100 parts by mass of the copolymer (A).

[Foaming Aid]

In addition, a foaming aid may be used in combination with the foaming agent, as required. The foaming aid has the functions of decreasing the decomposition temperature of the foaming agent, accelerating decomposition, making bubbles uniform, and the like. Examples of such a foaming aid include organic acids, such as salicylic acid, phthalic acid, stearic acid, and oxalic acid, and urea or derivatives thereof. These foaming aids are usually used in the proportion of 0.01 to 10 parts by mass, preferably 0.1 to 5 parts by mass, based on 100 parts by mass of the copolymer (A). It is desired to appropriately determine the optimum amount according to the required physical property values.

[Other Rubbers]

In addition, known other rubbers can be blended into the crosslinkable rubber composition used in the present invention in a range that does not impair the object of the present invention for use. Examples of such other rubbers can include natural rubbers (NR), isoprene-based rubbers, such as isoprene rubbers (IR), and conjugated diene-based rubbers, such as butadiene rubbers (BR), styrene-butadiene rubbers (SBR), acrylonitrile-butadiene rubbers (NBR), and chloroprene rubbers (CR).

[Vulcanizing Agent (Crosslinking Agent)]

Examples of the vulcanizing agent used for vulcanization include sulfur and sulfur compounds. Specific examples of the sulfur include powdered sulfur, precipitated sulfur, colloidal sulfur, surface-treated sulfur, and insoluble sulfur. Specific examples of the sulfur compounds include sulfur chloride, sulfur dichloride, polymeric polysulfides, and sulfur compounds that release active sulfur for vulcanization at vulcanization temperature, for example, morpholine disulfide, alkylphenol disulfides, tetramethylthiuram disulfide, dipentamethylenethiuram tetrasulfide, and selenium dimethyldithiocarbamate. Among these, sulfur is preferred. The sulfur or the sulfur compound is usually used in the proportion of 0.1 to 10 parts by mass, preferably 0.5 to 5 parts by mass, based on 100 parts by mass of the copolymer (A).

[Vulcanization Accelerator]

In addition, when sulfur or a sulfur compound is used as the vulcanizing agent, a vulcanization accelerator is preferably used in combination. Specific examples of the vulcanization accelerator include compounds such as sulfenamide-based compounds, such as N-cyclohexyl-2-benzothiazolesulfenamide (CBS), N-oxydiethylene-2-benzothiazolesulfenamide (OBS), N-t-butyl-2-benzothiazolesulfenamide (BBS), and N,N-diisopropyl-2-benzothiazolesulfenamide; thiazole-based compounds, such as 2-mercaptobenzothiazole (MBT), 2-(2,4-dinitrophenyl)mercaptobenzothiazole, 2-(4-morpholinodithio)benzothiazole, 2-(2,6-diethyl-4-morpholinothio)benzothiazole, and dibenzothiazyl disulfide; guanidine-based compounds, such as diphenylguanidine (DPG), triphenylguanidine, diorthotolylguanidine (DOTG), orthotolylbiguanide, and diphenylguanidine phthalate; aldehyde-amine- or aldehyde-ammonia-based compounds, such as an acetaldehyde-aniline condensate, a butyraldehyde-aniline condensate, hexamethylenetetramine (H), and acetaldehyde ammonia; imidazoline-based compounds, such as 2-mercaptoimidazoline; thiourea-based compounds, such as thiocarbanilide, diethylthiourea (EUR), dibutylthiourea, trimethylthiourea, and diorthotolylthiourea; thiuram-based compounds, such as tetramethylthiuram monosulfide (TMTM), tetramethylthiuram disulfide (TMTD), tetraethylthiuram disulfide, tetrabutylthiuram disulfide, tetrakis(2-ethylhexyl)thiuram disulfide (TOT), and dipentamethylenethiuram tetrasulfide (TRA); dithiocarbamates, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, and tellurium dimethyldithiocarbamate; xanthates, such as zinc dibutylxanthate; and zinc white (zinc oxide). These vulcanization accelerators are usually used in the proportion of 0.1 to 20 parts by mass, preferably 0.2 to 10 parts by mass, based on 100 parts by mass of the copolymer (A).

[Vulcanization Aid]

The vulcanization aid can be appropriately selected according to the application. A vulcanization aid can be used alone, or two or more vulcanization aids can be mixed and used. Specific examples of the vulcanization aid include magnesium oxide and zinc white (zinc oxide, for example, "META-Z102" (trade name; manufactured by Inoue Calcium Corporation)). The amount of the vulcanization aid blended is usually 1 to 20 parts by mass based on 100 parts by mass of the copolymer (A). Examples of the vulcanization aid include quinone dioxime-based vulcanization aids, such as p-quinone dioxime; acrylic vulcanization aids, such as ethylene glycol dimethacrylate and trimethylolpropane trimethacrylate; allyl-based vulcanization aids, such as diallyl phthalate and triallyl isocyanurate; and in addition, maleimide-based vulcanization aids; and divinylbenzene.

[Preparation of Rubber Composition]

The rubber composition used in the present invention can be prepared by kneading the above copolymer (A), clay (B), and sulfur atom-containing silane coupling agent (C) together with additives, such as, for example, carbon black, a rubber-reinforcing agent, an inorganic filler, and a softening agent, by an internal mixer (closed mixer) such as a Banbury mixer, a kneader, or Intermix at a temperature of 80 to 170° C. for 2 to 20 minutes, then adding and mixing sulfur as a vulcanizing agent and a vulcanization accelerator, a vulcanization aid, a foaming agent, and a foaming aid as required, kneading the mixture at a roll temperature of 40 to 80° C. for 5 to 30 minutes using a roll such as an open roll or a kneader, and then sheeting the kneaded material.

<Railroad Rail Track Pad>

A railroad rail track pad according to the present invention is characterized by being obtained by crosslinking the above rubber composition. The type of the track pad includes those mentioned in JIS E 1117 but, of course, is not limited to these. Examples of the method for crosslinking the rubber composition include the following two methods.

(i) A method of premolding into the desired shape the rubber composition in which the above vulcanizing agent is blended, usually by various molding methods, such as an extrusion machine, a calender roll, a press molding, an injection molding machine, a transfer molding machine, and a heating vessel in the form of heating by hot air, a glass bead fluidized bed, UHF (ultrahigh frequency electromagnetic wave), steam, or LCM (hot molten salt vessel), and performing heating simultaneously with the premolding or after introducing the molded material into a vulcanization vessel.

(ii) A method of premolding the above rubber composition by the above molding methods and irradiating the premolded rubber composition with an electron beam.

Particularly, the composition according to the present invention has low viscosity that is suitable for injection molding and has excellent productivity.

In the case of method (i), the above vulcanizing agent is used, and the above vulcanization accelerator and/or the above vulcanization aid can also be used in combination as required. In addition, the temperature in heating is generally 100 to 300° C., preferably 120 to 270° C., and further preferably 120 to 250° C., and it is desired to perform heating for 0.5 to 30 minutes, preferably 0.5 to 20 minutes, and further preferably 0.5 to 15 minutes.

When the above rubber composition is molded and vulcanized, a mold may be used, and no mold may be used. When no mold is used, the rubber composition is usually continuously molded and vulcanized.

In the case of method (ii), the premolded rubber composition can be irradiated with an electron beam having an energy of 0.1 to 10 MeV so that the absorbed dose becomes 0.5 to 35 Mrad, preferably 0.5 to 20 Mrad, and further preferably 1 to 10 Mrad.

<Crosslinked and Foamed Product>

The railroad rail track pad according to the present invention is preferably made of a crosslinked and foamed product obtained by crosslinking and foam-molding the above rubber composition. In order to crosslink and foam-mold the above rubber composition, usually, using a rubber composition containing a foaming agent, crosslinking and foaming are performed. One example of the crosslinking and foam molding includes a method of filling a mold having a predetermined shape with the rubber composition and crosslinking and foaming the rubber composition by a hot press to obtain a track pad.

In addition, in the crosslinked and foamed product, the specific gravity is preferably 0.03 to 0.9 g/cm$^3$, more preferably 0.1 to 0.8 g/cm$^3$, particularly preferably 0.1 to 0.75 g/cm$^3$, and most preferably 0.1 to 0.7 g/cm$^3$.

EXAMPLES

Next, the present invention will be described in further detail by referring Examples, but the present invention is not limited by these.

Examples 1 and Comparative Examples 1 and 2

A composition having a composition shown in Table 1 was prepared using the following copolymers 1 and 2. Using a 140 mm×125 mm×10 mmt mold, the mold was filled with the composition in Table 1 in an amount of charge of 140 g (thickness of 7 mm), and the composition was subjected to crosslinking and foaming under the conditions of 170° C.×10 minutes to produce a foamed and crosslinked product rubber for a railroad rail track pad. Various physical properties were evaluated.

[Copolymer 1]

An ethylene/α-olefin/non-conjugated polyene random copolymer produced by a method similar to that of Example 1 in WO2010/064574 (the molar ratio difference was adjusted by the amount of feed)

Component [c-1]=ENB
Component [c-2]=VNB
Requirement (1): component [b]=36.8 mole %
Requirement (2): component [c-1]+component [c-2]=2.91 mole %
Requirement (3): component [c-1]/component [c-2]=96/4
Requirement (4): $ML_{1+4}$ (100° C.)=32
Requirement (5): iodine value=0.8 g/100 g
Requirement (6): Ea=43.0 kJ/mol

[Copolymer 2]

An ethylene/α-olefin/non-conjugated polyene random copolymer produced by a method similar to that of Example 1 in WO2010/064574 (the molar ratio difference was adjusted by the amount of feed)

Ethylene/α-olefin/non-conjugated polyene random copolymer:
Component [c-1]=ENB
Component [c-2]=VNB
Requirement (1): component [b]=40.3 mole %

Requirement (2): component [c-1]+component [c-2]= 4.47 mole %
Requirement (3): component [c-1]/component [c-2]=99/1
Requirement (4): $ML_{1+4}$ (100° C.)=81
Requirement (5): iodine value=0.32 g/100 g
Requirement (6): Ea=38 kJ/mol

TABLE 1

|  | Comparative Example 1 | Comparative Example 2 | Example 1 |
|---|---|---|---|
| Copolymer (A) |  |  |  |
| Copolymer 2 | 50 |  |  |
| Copolymer 1 | 50 | 100 | 100 |
| Clay (B) |  | 40 | 55 |
| Sulfur atom-containing silane coupling agent (C) | 1 |  | 1 |
| Crosslinking agent (D) |  |  |  |
| Sulfur | 1.5 | 0.75 | 0.75 |
| Crosslinking aid 1 |  | 0.75 | 0.75 |
| Crosslinking aid 2 | 1.5 | 1.5 | 1.5 |
| Crosslinking aid 3 | 0.5 | 0.5 | 0.5 |
| Crosslinking aid 4 | 0.5 | 0.5 | 0.5 |
| Crosslinking aid 5 | 0.5 | 0.5 | 0.5 |
| Active zinc white | 5 | 5 | 5 |
| Stearic acid | 1 | 1 | 1 |
| Polyethylene glycol | 1 | 1 | 1 |
| Carbon black 1 | 55 | 55 | 55 |
| Carbon black 2 | 10 | 10 | 10 |
| Silica | 20 |  |  |
| Process oil | 10 | 10 | 10 |
| Foaming agent |  |  |  |
| Foaming agent 1 | 2.5 | 2.5 | 2.5 |
| Foaming agent 2 | 5 | 5 | 5 |
| (All of above, parts by mass) |  |  |  |
| <Physical properties of unvulcanized rubber> |  |  |  |
| $ML_{1+4}$ (125° C.) | 68 | 38 | 43 |
| Vm (125° C.) | 72 | 39 | 44 |
| Flow length [mm/13 g] | 110.0 | 120.0 | 115.0 |
| <Physical properties of crosslinked and foamed product> |  |  |  |
| Specific gravity [g/cm$^3$] | 0.72 | 0.69 | 0.77 |
| Expansion ratio [times] | 1.60 | 1.78 | 1.65 |
| Tensile strength at break (TB) [MPa] | 7.5 | 4.3 | 5.0 |
| Elongation at break (EB) [%] | 176 | 216 | 132 |
| Compression set [%] | 10 | 14 | 10 |

Details of the composition in Table 1 are as follows.

Clay (B): trade name "BURGESS KE", Burgess Pigment Company

Silane coupling agent (C): 3-mercaptopropyltrimethoxysilane, trade name "KBM-803", Shin-Etsu Chemical Co., Ltd.

Crosslinking agent (D):

Sulfur: trade name "ALPHAGRAN S-50EN", TOUCHI CO., LTD.

Crosslinking aid 1: trade name "SANFEL R", SANSHIN CHEMICAL INDUSTRY CO., LTD.

Crosslinking aid 2: trade name "Nocceller MDB", Ouchi Shinko Chemical Industrial Co., Ltd.

Crosslinking aid 3: trade name "SANCELER BZ", SANSHIN CHEMICAL INDUSTRY CO., LTD.

Crosslinking aid 4: trade name "SANCELER TT", SANSHIN CHEMICAL INDUSTRY CO., LTD.

Crosslinking aid 5: trade name "SANCELER 22-C", SANSHIN CHEMICAL INDUSTRY CO., LTD.

Active zinc white: trade name "META-Z 102", Inoue Calcium Corporation

Processing aid: stearic acid (STEARIC ACID CHERRY (POWDER)®), NOF Corporation

Polyethylene glycol: PEG #400, Lion Corporation

Carbon black 1: trade name "SEAST 5", Tokai Carbon Co., Ltd.

Carbon black 2: trade name "SEAST SO", Tokai Carbon Co., Ltd.

Silica: trade name "Nipsol VN3", Tosoh Silica Corporation

Process oil: trade name "SUNPAR 2280", JAPAN SUN OIL COMPANY, LTD.

Foaming agent 1: trade name "NEOCELLBORN N #1000M", EIWA CHEMICAL IND. CO., LTD.

Foaming agent 2: trade name "Expancel 909-80", Japan Fillite co., ltd.

<Method for Evaluating Physical Properties of Unvulcanized Rubber>

Mooney viscosity $ML_{1+4}$ (125° C.): the Mooney viscosity was measured using a Mooney viscometer (model SMV202 manufactured by SHIMADZU CORPORATION) according to JIS K6300-1 under a temperature condition of 125° C.

Minimum viscosity Vm: the minimum viscosity was measured according to JIS K6300-1. Specifically, changes in the Mooney viscosity were measured at 125° C. using a Mooney viscometer (model SMV202 manufactured by SHIMADZU CORPORATION), and the minimum viscosity (Vm) from the start of the measurement was obtained.

Flow length: Jig 1 illustrated in FIG. 1 was prepared. A mold of this jig was pre-heated at 170° C., and 13 g of specimen 2 was set in a cavity of lower die 12. A load of 50 tons was applied to upper die 11 to press the specimen at 170° C. for 10 minutes. The length of the specimen flowing into a flow length measuring groove 16 of the mold was measured as flow length. In FIG. 1, reference numeral 13 denotes an upper mold, reference numeral 14 denotes a lower mold, and reference numeral 15 denotes a specimen-retaining portion. (1) to (7), which represent the size of each portion, were set as (1)=60 mm, (2)=7 mm, (3)=3 mm, (4)=40 mm, (5)=5 mm, (6)=10 mm, and (7)=155 mm.

<Method for Evaluating Physical Properties of Crosslinked and Foamed Product>

Specific gravity: the specific gravity was measured according to JIS Z8807.

Expansion ratio: the expansion ratio was calculated from the specific gravity of a compound obtained from specific gravities of respective compounding agents; and the specific gravity of a sponge, obtained by the above method.

Tensile strength at break (TB), elongation at break (EB): the tensile strength and the elongation at break of a test piece were measured according to JIS K6251.

Compression set: according to ASTM D395, the crosslinked and foamed product was compressed with an applied pressure of 1.5 KN at 70° C. for 48 hours, then left to stand for 30 minutes, jig taken out, and allowed to cool for 1 hour, and then the thickness was measured. The compression set was obtained from a relational expression between the thickness and the original thickness.

<Evaluation>

The vulcanized rubber composition of Example 1 has good injection moldability because the viscosity Vm (125° C.) is 50 or less. In addition, the crosslinked and foamed product exhibits good rubber elasticity by the compression set being 10% or less and is a material that is suitable for a railroad rail track pad.

REFERENCE SIGNS LIST

1 Flow length measuring jig
11 Upper die
12 Lower die
13 Upper mold
14 Lower mold
15 Specimen-retaining portion
16 Flow length measuring groove
2 Specimen

The invention claimed is:
1. A railroad rail track pad composition comprising an ethylene/α-olefin/non-conjugated polyene random copolymer (A), clay (B), and a sulfur atom-containing silane coupling agent (C), wherein
the ethylene/α-olefin/non-conjugated polyene random copolymer (A) is:
a copolymer comprising structural units derived from ethylene [a], an α-olefin [b] having 3 to 20 carbon atoms, a non-conjugated polyene [c-1] comprising in a molecule only one partial structure represented by the following structural formula (I) or (II):

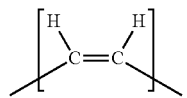  (I)

wherein (I) is a partial structure of a cyclic olefin,

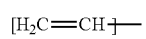  (II)

and a non-conjugated polyene [c-2] comprising in a molecule a total of two or more partial structures selected from the group consisting of structural formulas (I) and (II), and satisfying conditions of the following (1) to (6):
(1) the structural unit derived from the α-olefin [b] having 3 to 20 carbon atoms is present at 10 to 50 mole % in 100 mole % of all structural units,
(2) a sum of a mole % of the structural unit derived from the non-conjugated polyene [c-1] and a mole % of the structural unit derived from the non-conjugated polyene [c-2] is 1.0 to 6.0 mole %,
(3) a ratio of the mole % of the structural unit derived from the non-conjugated polyene [c-1] to the mole % of the structural unit derived from the non-conjugated polyene [c-2] ([c-1]/[c-2]) is 75/25 to 99.5/0.5,
(4) Moony viscosity measured at 100° C. [$ML_{1+4}$ (100° C.)] is 10 to 90,
(5) an apparent iodine value of the structural unit derived from the non-conjugated polyene [c-2] is 0.1 to 3.0 g/100 g,
(6) the following formula (i) is satisfied:

$$50 > \text{activation energy of the flow}(Ea)[\text{kJ/mol}] > 35 \quad (i),$$

wherein the clay (B) is surface-treated with a silane coupling agent, and
wherein a compression set when the composition is formed into a crosslinked and formed product is 10% or less.

2. The railroad rail track pad composition according to claim 1, wherein the ethylene α-olefin non-conjugated polyene random copolymer (A) is synthesized using a metallocene catalyst.

3. The railroad rail track pad composition according to claim 1, wherein the non-conjugated polyene [c-1] is 5-ethylidene-2-norbornene (ENB), and the non-conjugated polyene [c-2] is 5-vinyl-2-norbornene (VNB).

4. The railroad rail track pad composition according to claim 1 further comprising a crosslinking agent (D).

5. The railroad rail track pad composition according to claim 4, wherein the crosslinking agent (D) is a sulfur-based crosslinking agent.

6. The railroad rail track pad composition according to claim 1, wherein the sulfur atom-containing silane coupling agent (C) comprises one or more structures selected from a mercapto group and a sulfide.

7. The railroad rail track pad composition according to claim 1 further comprising a foaming agent.

8. A method for producing a railroad rail track pad, the method comprising crosslinking and molding the composition according to claim 1.

9. A method for producing a railroad rail track pad, the method comprising crosslinking and foam-molding the composition according to claim 6.

* * * * *